(12) United States Patent
Kumar et al.

(10) Patent No.: US 8,276,189 B2
(45) Date of Patent: Sep. 25, 2012

(54) METHOD, SYSTEM AND APPARATUS FOR INDIRECT ACCESS BY COMMUNICATION DEVICE

(75) Inventors: Sampath Swaroop Kumar, Singapore (SG); Chun Keong Benjamin Lim, Singapore (SG); Pek Yew Tan, Singapore (SG); Yoshihiko Takei, Kanagawa (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 12/159,888

(22) PCT Filed: Feb. 6, 2007

(86) PCT No.: PCT/JP2007/052440
§ 371 (c)(1),
(2), (4) Date: Jun. 23, 2009

(87) PCT Pub. No.: WO2007/091699
PCT Pub. Date: Aug. 16, 2007

(65) Prior Publication Data
US 2010/0229229 A1 Sep. 9, 2010

Related U.S. Application Data

(60) Provisional application No. 60/765,169, filed on Feb. 6, 2006.

(51) Int. Cl.
*H04L 29/06* (2006.01)
(52) U.S. Cl. .............. 726/3; 726/10; 455/406; 455/408; 455/412.2
(58) Field of Classification Search ................ 726/3, 10; 455/406, 408, 412.2
See application file for complete search history.

(56) References Cited

U.S. PATENT DOCUMENTS
2005/0197098 A1* 9/2005 Trossen ........................ 455/406
2005/0272408 A1 12/2005 Wilkes-Gibbs

FOREIGN PATENT DOCUMENTS
EP 1178693 A1 * 2/2002

OTHER PUBLICATIONS
International Search Report dated Jul. 19, 2007, issued in corresponding Application No. PCT/JP2007/052440, filed Feb. 6, 2007.

* cited by examiner

*Primary Examiner* — Jeffrey Pwu
*Assistant Examiner* — Hee Song
(74) *Attorney, Agent, or Firm* — Seed IP Law Group PLLC

(57) ABSTRACT

A system that allows indirect access of a network by TE, comprising TE device information; a personal network (PN) server; a master UE of a personal network; a TE of a personal network; and a UE B connected to a WAN which forwards data to and from TEs. Using the master UE the user sets configuration details which is the TE device information and stored at the PN Server. The TE device information contains data which is used to allow and control access of TE to the network, when the TE uses other UEs to access the network. When the TE tries to access the network through another UE B, the PN Server uses the TE device information to authenticate and control access of TE. UE B acts as a forwarding device in this sequence between TE and the PN server.

36 Claims, 12 Drawing Sheets

METHOD, SYSTEM AND APPARATUS FOR INDIRECT ACCESS BY COMMUNICATION DEVICE

CROSS-REFERENCES TO RELATED APPLICATIONS

This application claims the benefit under 35 U.S.C. §119 (e) of U.S. Provisional Patent Application No. 60/765,169, filed Feb. 6, 2006, which is incorporated herein by reference in its entirety.

BACKGROUND OF THE INVENTION

Ad-hoc networks are increasingly popular due to their minimum dependence on infrastructure. Ad-hoc networks may be seen as a means for extending the range of existing networks, where mobile nodes attached to the infrastructure network are used as access points by other nodes.

This usage is very useful for devices that are constrained by their access network limitations. By forming a personal area network ("PAN") in an ad-hoc manner, devices can still access the network using low power short range connectivity. This allows devices such as MP3 players or cameras to direct their power resources to their specific features for processing music or video captures, rather than channel that power towards long range radio transmission. The PAN allows peripheral devices to achieve their characteristic features while providing the peripheral devices connectivity to the wide area network through other nodes in the network.

A cellular network is a popular wide area access network technology. The cellular network provides voice and data access to its subscribers, and the number of data users has been increasing much more rapidly than voice users in the 3G version of cellular systems. Although the cellular system is a popular access technology, it currently limits its access to cellular access technologies (for example, WCDMA or cdma2000 standards) and have recently included WLAN as part of the infrastructure. Other upcoming WANs include WiFi and WiMAX technologies.

Currently, 3GPP is also dealing with personal area networks, concentrating on single user PANs where all devices in a PAN belong to a single user.

It is therefore an object of the present invention to allow devices with all access network interfaces (specifically, short range wireless networks) to be able to access the WAN securely through any available mobile device, thus extending the PAN to a multi-user scenario.

Devices with an existing relationship and direct access to the WAN will hereinafter be referred to as user equipment ("UE") and devices without an existing relationship or a direct access interface to the WAN will be hereinafter referred to as terminal equipment ("TE").

US Patent Application No. 2005/0197098 A1, entitled "Method and apparatus to provide charging for ad-hoc service provisioning between trusted parties and between untrusted parties," filed Sep. 8, 2005, by Dirk Trossen, describes a similar scenario of an originating device using a bridging device to connect with a WAN, in the process negotiating and billing the originating device. The method depends on the trusted code to be present on both these devices thus extending the system to communication between both trusted and untrusted parties.

The above reference mentions that the trusted code in TE may be installed either by download over the air through UE, or the trusted code may be pre-loaded and integrated with software on the device. The former method of downloading using UE raises security concerns as the technique assumes the involved parties may trust each other, which might not be true. Some of the concerns are the UE manipulating the trusted code or making copies of the trusted code which may be used later to fake TE access. The latter method of pre-loading and integrating every device with the trusted code raises more issues with additional standardization of such code into all generic devices, or change of owner, or change of service provider, or user requirements of access control of these devices into the network. The invention solves this problem by re-using an existing relationship between the user and the network. The user establishes a trust between his TE and the network by registering his TE, and defining limitations of its use, thus increasing the trust in the system when the TE accesses the network through untrusted UE.

The next problem can be seen by the UE charging the TE. This would provide an inflexible method of event monitoring and could practically support only a few charging schemes such as byte-counting. Any more sophistication in charging scheme would require the UE charging software to know more about the content of the data. Therefore, content-based charging schemes will be very difficult to support in this method.

The present invention aims to solve this problem by simply using UE as a proxy that relays messages between TE and the network, and hence allows the charging to be done at the network.

The present invention aims to provide solutions for the details that the service provider may have about TE, and how the trusted code is transferred based on an existing subscriber relationship.

SUMMARY OF THE INVENTION

To alleviate some of the issues described above, the present invention proposes a user-oriented solution for providing devices with access rights to the network by registering the devices for indirect access on a requirement basis. This system may be used by service providers to extend their networks to devices that do not have the access technology to access the service provider networks or have the security means to establish credentials. A user is able to register TE with a PN server for indirect access. When this is done, the devices without direct access capability may use any other multi-interfaced UEs as access points to gain access to the cellular network.

The focus of this invention is to provide a pre-established trust between TE owned by a user and the network based on an existing subscriber relationship with the same user and define access limitations for that trust. The invention proposes a method of using this trust to allow other UEs acting as access points to provision the TE in an ad-hoc manner securely without the requirement of the UE requiring charging software and TE authentication responsibilities. It allows the UE in an access point mode to simply act as a forwarding device, thus enabling it to gain credit for doing so.

The present invention assumes that each TE is owned by a user who already has an existing subscriber relationship with a service provider. The invention allows a user to register TE for indirect access to the network. By "indirect access," it is meant that the device may be able to connect to the network using any other UE, using the UE as an access point or a forwarding device, even if the UE does not belong to the same user. The information stored in the TE is used by the network to recognize its link to its user and therefore it is PN. In this way, any UE in the network may act as an access point to other devices in an ad-hoc manner by forming a PAN. In addition, the UE acting as an access point merely acts as a forwarding device as a TE may possess security keys which prevent the UE from any intended access to that data. Thus the UE may not be able to obtain and manipulate security related information regarding the TE as in the previous case as the TE would already possess pre-established keys which allow it to hold secure communications with the PN server.

BEST MODE FOR CARRYING OUT THE INVENTION

In the following detailed description of exemplary embodiments of the invention, reference is made to the accompanying drawings, which form a part hereof, and which is shown by way of illustration, specific exemplary embodiments of which the invention is practiced. Each embodiment is described in sufficient detail to enable those skilled in the art to practice the invention, and it is to be understood that other embodiments may be utilized, and other changes may be made, without departing from the spirit or the scope of the invention. The following detailed description is, therefore, not to be taken in a limiting sense, and the scope of the patent invention is defined only in the appended claims.

Examples will be used to illustrate the present invention. Throughout the following description, the following terms may take their respective, specific meanings unless explicitly stated otherwise.

"User A" owns multiple devices in a personal network ("PN").

"Service provider" refers to an organization or technician that maintains or services something like a network.

"Master UE" refers to the master node in a personal network, and has a subscription with a service provider.

"TE A" does not have a subscription or the means of accessing the service provider network.

"UE B" has multiple interfaces, capable of forwarding data from another device. UE B may be motivated to forward data by gaining credit from the service provider as it helps in extension of the operator network.

The data required for managing the PN may be stored in a PN server 10. The PN server 10 may be local to a user (home network) or centrally managed by a service provider providing personal network management to its subscribers.

Each of the devices in a PN may identify each other through a common identity such as a personal network identity ("PNI"). The key specific to a particular TE may be specified as PNI_key. The PNI may be generated by the master UE 12 or by the PN server 10.

Access to the network is usually restricted by prior association proof and access network limitations. For example, the prior association may have been established by a subscriber identity module ("SIM") presence in the UE or other smart card technologies. The PN server 10 may only be accessible by cellular or WiFi or WiMAX.

The preferred embodiments of this invention are listed in accordance.

Figure 1:
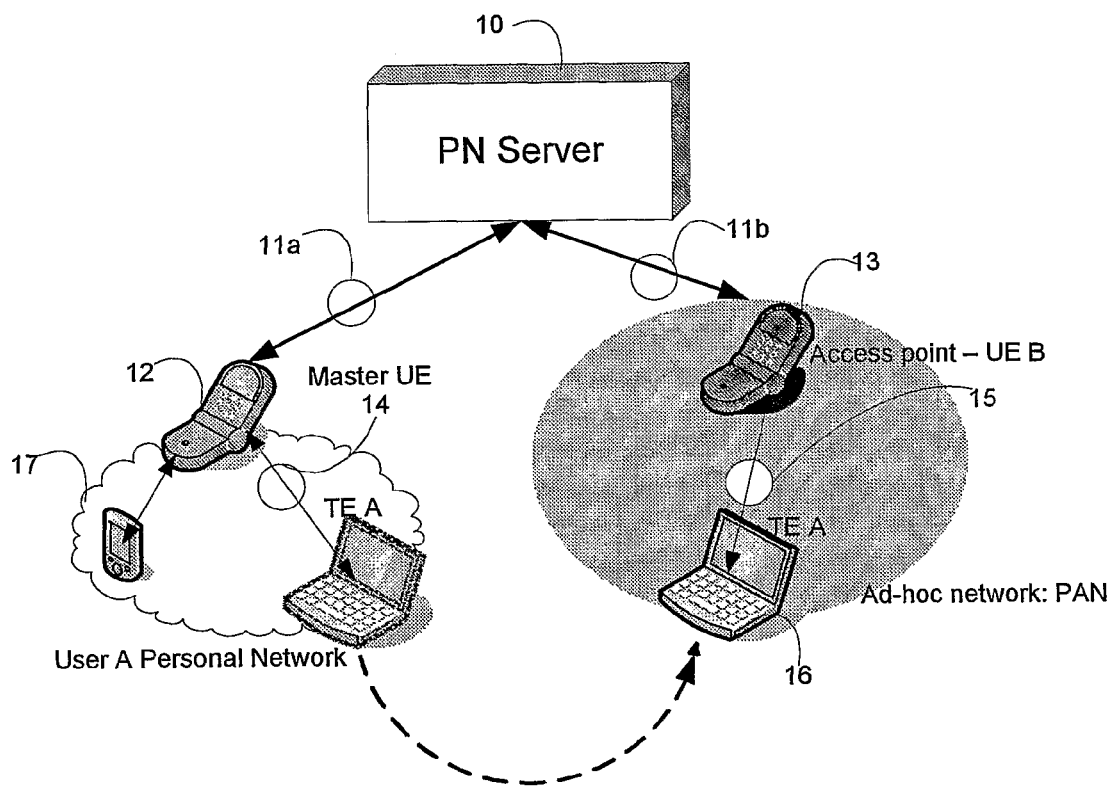
FIG. 1 is a diagram illustrating the preferred system for indirect access of WAN, according to the preferred embodiment of the invention.

FIG. 1 describes a high level diagram of the present invention where a PN server 10 allows TEs of a PN 17 to be pre-registered through a master UE 12 in order for them to use any other UE as an access point (UE B 13) and still be seen as an independent entity of the network by the PN server 10. PN 17 is a user's own network, in which his devices may interact with each other securely and seamlessly. PN server 10 is a device which stores personal network information and manages seamless, secure and private connectivity between multiple devices of a certain PN 17. Link 11 (link 11a and/or link 11b) may be any wireless network interface supported by the PN server 10, such as cellular (CDMA2000, WCDMA, etc.), WiMAX, WLAN, Bluetooth, but not limited to these. Link 14 may be any access technology supported by the PN 17 including Ethernet or WLAN or Bluetooth, but not limited to these. It may be a physical interface between master UE 12 and TE A 16, when they could be directly connected. Master UE 12 may also use secure memory devices to store TE device information 22, which is then transferred to the TE A 16, thus providing secure means of transferring security keys. Link 15 is an ad-hoc network supported by a PAN technology such as UWB or Bluetooth or direct connections. UE B 13 is a UE in access point mode, as is it allows other TEs to access the network when acting as an access point. The network may provide credit of some form to the UE B 13 when it helps other devices access the network through it.

A system that allows indirect access of a network by TE A 16, comprising TE device information; a personal network (PN) server 10; a master UE 12 of a personal network; a TE A 16 of a personal network; and a UE B 13 connected to a WAN which forwards data to and from TEs. TE A 16 is a device owned by the user along with the master UE 12. Using the master UE 12 the user sets configuration details which is the TE device information and stored at the PN Server 10. The TE device information contains data which is used to allow and control access (access limitations) of TE A 16 to the network, when the TE A 16 uses other UEs (not owned by the user) to access the network. When the TE A 16 tries to access the network through another UE (UE B 13), the PN Server 10 uses the TE device information to authenticate and control access of TE A 16. UE B 13 acts as a forwarding device in this sequence between TE A 16 and the PN server 10. A method of TE A 16 registration for indirect access comprises the steps of master UE 12 requesting the PN server 10 to register the TE A 16 for indirect access PN server 10 generates an access key for the TE A 16 and transfers it to master UE 12, master UE 12 transfers access key to the TE A 16 securely. The master UE 12 may further place access limitations for the TE A 16, which may be provided by a temporary ID by the PN server 10. A method of TE A 16 accessing the network indirectly through UE B 13 comprises the steps of PN server 10 authenticating the TE A 16 as a valid node; verifying if TE A 16 is within its access limitations.

Figure 2A:
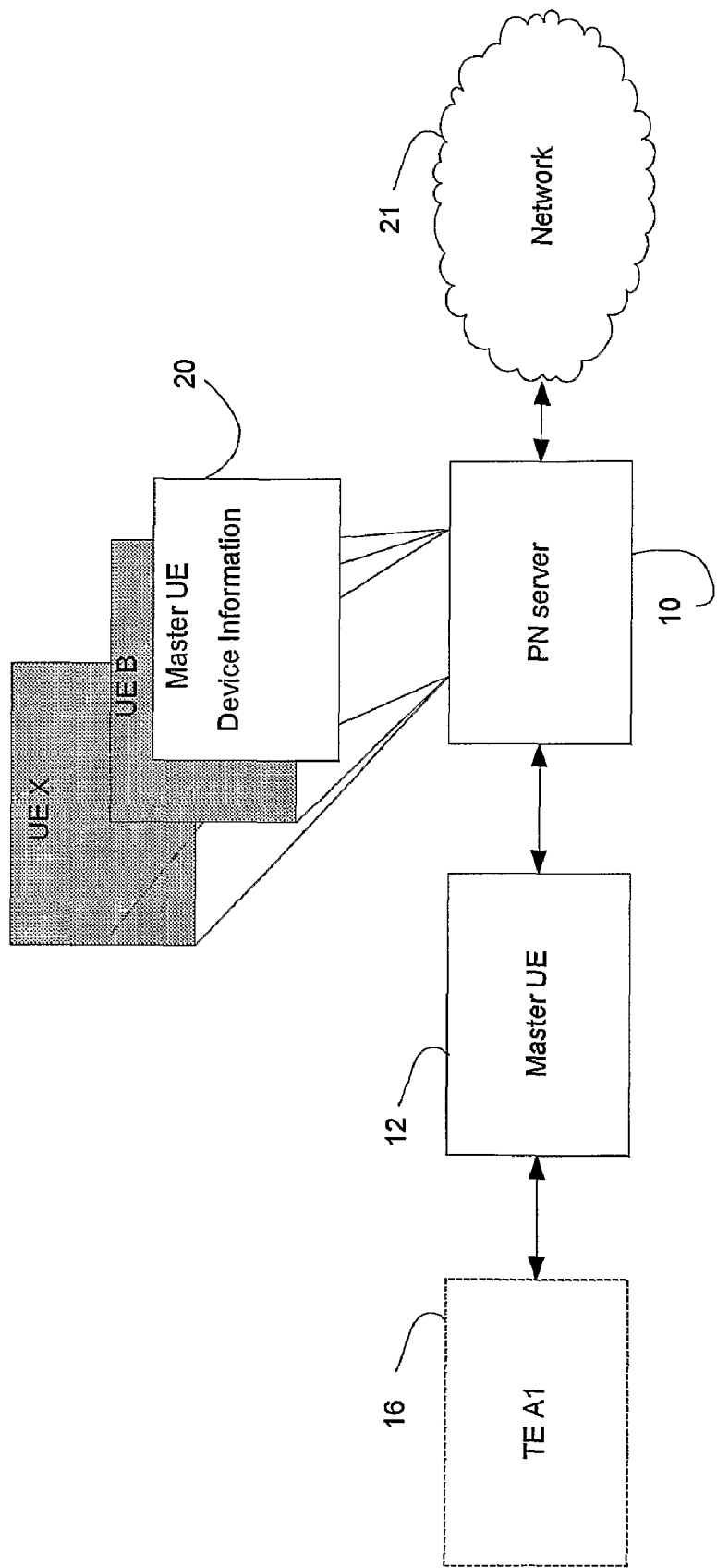
FIG. 2 is a diagram comparing the prior art (FIG. 2A) to the invention (FIG. 2B) for TE access to WAN, according to the preferred embodiment of the invention.
Figure 2B:
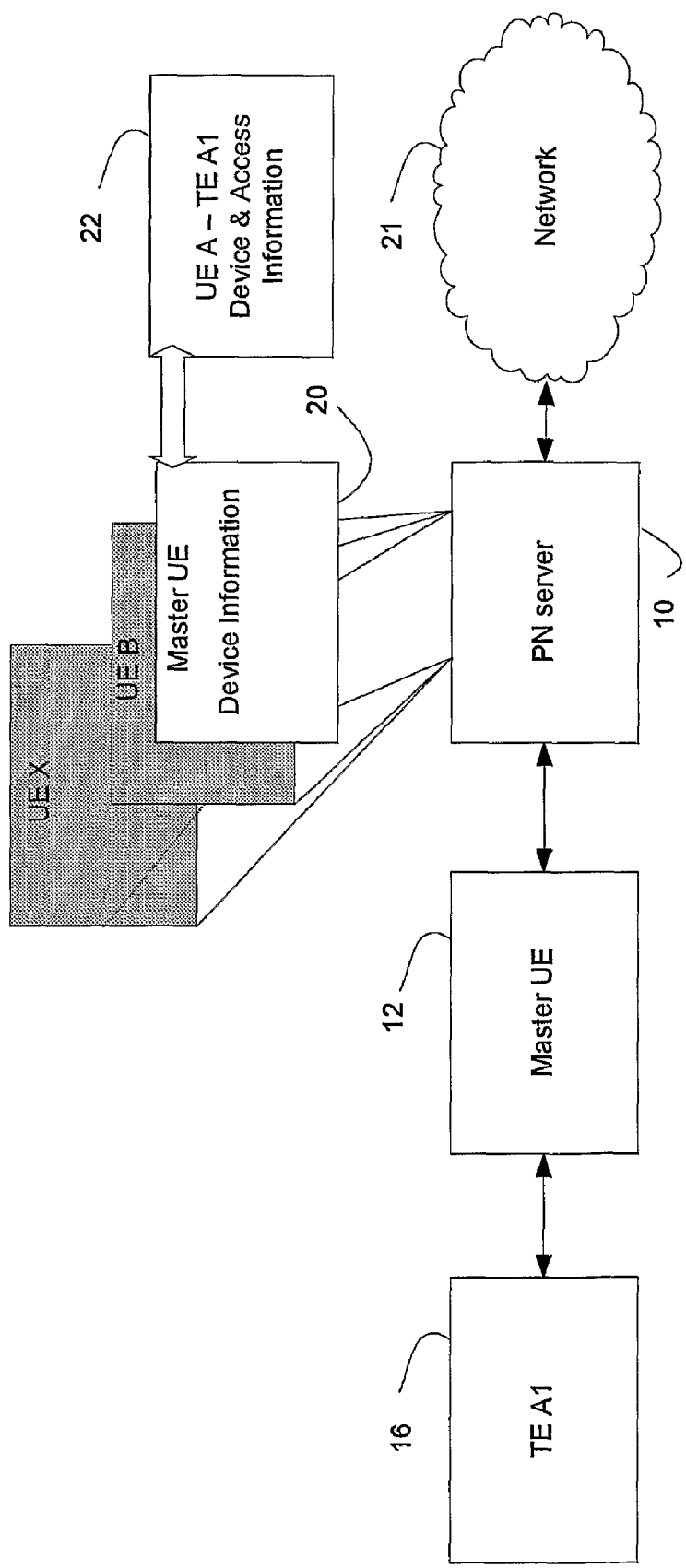

In FIG. 2A, a user is assumed to have a subscription with a service provider. The service provider hosts a PN server 10 which stores the PN 17 details of the user, which maintains all information with respect to a user's registered UEs. But access to the WAN 21 is limited as mentioned above, where some of the user's devices neither have a SIM relationship with the service provider nor have the radio access means to access the server. The only way TE may access the network is to use master UE 12 as a bridging device, where the network is unaware of its existence as shown in FIG. 2A. In FIG. 2B, the present invention allows a user nominated UE to be the master UE 12, which may act as a lower level network provisioning device. It may register identities of TEs with the PN server 10 thus identifying them as entities at the PN server 10. Further, the master UE 12 may set certain access limitations 44 on the TE. The PN server 10 stores all relevant TE information 22 in its database.

Alternatively, the PN server 10 may be hosted locally. The PN server 10 may be a home gateway with local wireless connectivity such as WLAN or UWB or Bluetooth, but limited to these.

In another embodiment, the master UE 12 may deregister any TE A 16 previously registered. In this case, the PN server 10 may purge all data related to the particular TE.

Figure 3A:
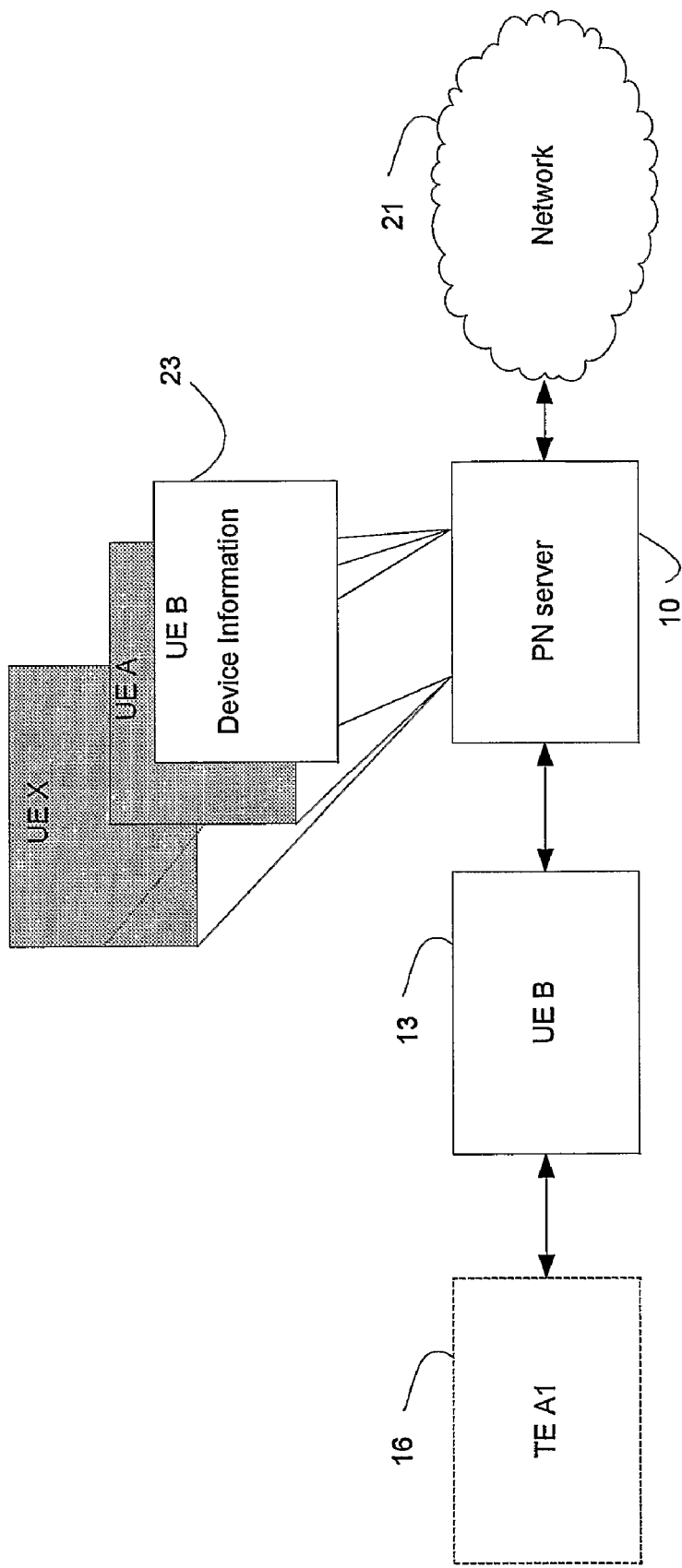
FIG. 3A and FIG. 3B is a diagram illustrating TE access of WAN through any UE, according to the preferred embodiments of the invention.
Figure 3B:
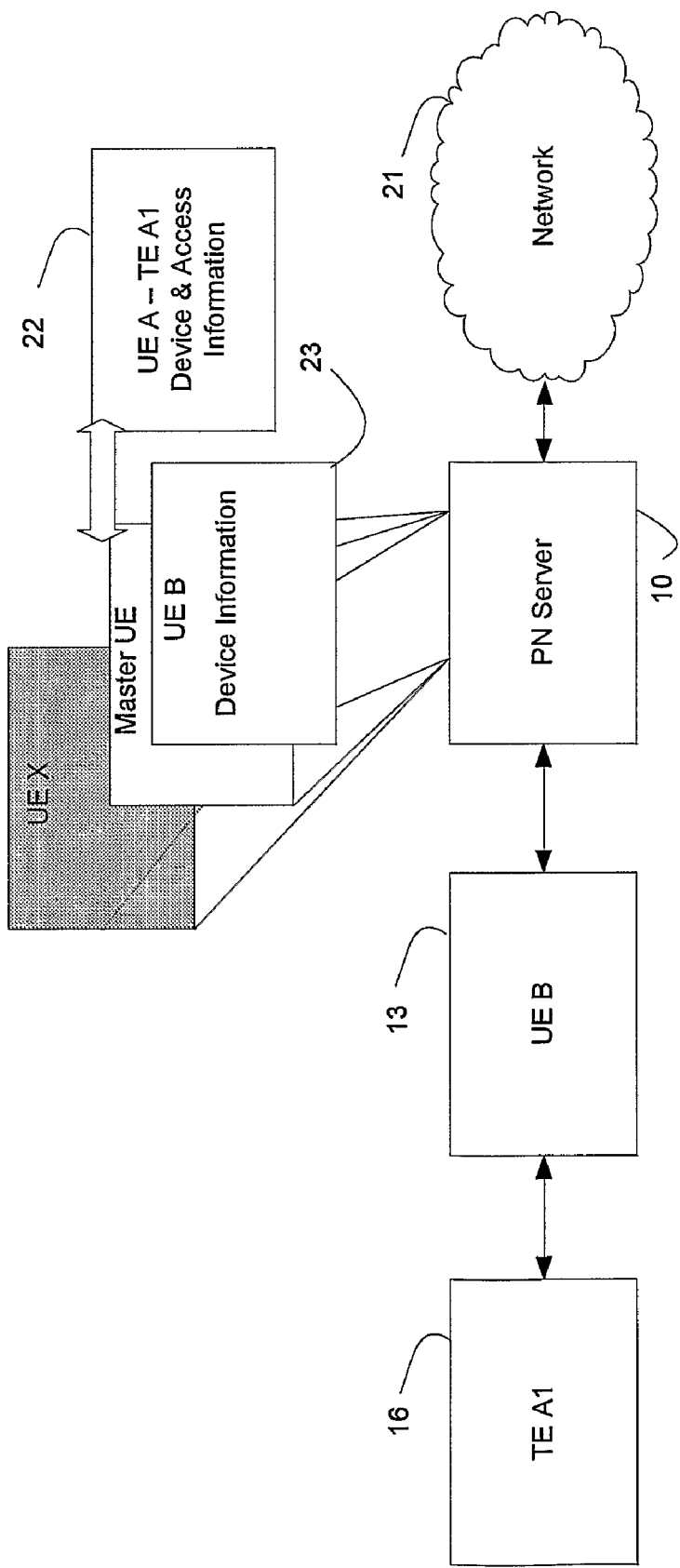

FIG. 3 illustrates TE access to the network indirectly through another UE (UE B 13) acting as an access point. Without previous registration, the access node is seen as UE B 13 by the PN server 10. This may not be a motivating case for the ad-hoc access since UE B 13 may be unknown to TE A 16 and may not be willing to act as an access point and may still be charged for access. In FIG. 3, with this invention, TE is able to communicate securely using UE B 13 purely as an access point. Using the security keys 45 stored in the TE information 22, the PN server 10 may check the authenticity of this TE and its association with its master UE 12, and recognize that TE A's 16 data stream is being sent through UE B 13. In addition the PN server may also control TE's access by enabling the access limitations 44 enabled for the TE.

In another embodiment, UE B 13 may be known or trusted by the master UE. In addition, the master UE 12 may have a list of UE it may delegate as gateway devices for TE A 16. The PN server 10 is aware of the list of UE trusted by UE B 13, and may use the list to ensure TE A 16 is attached to a trusted UE.

Figure 4:
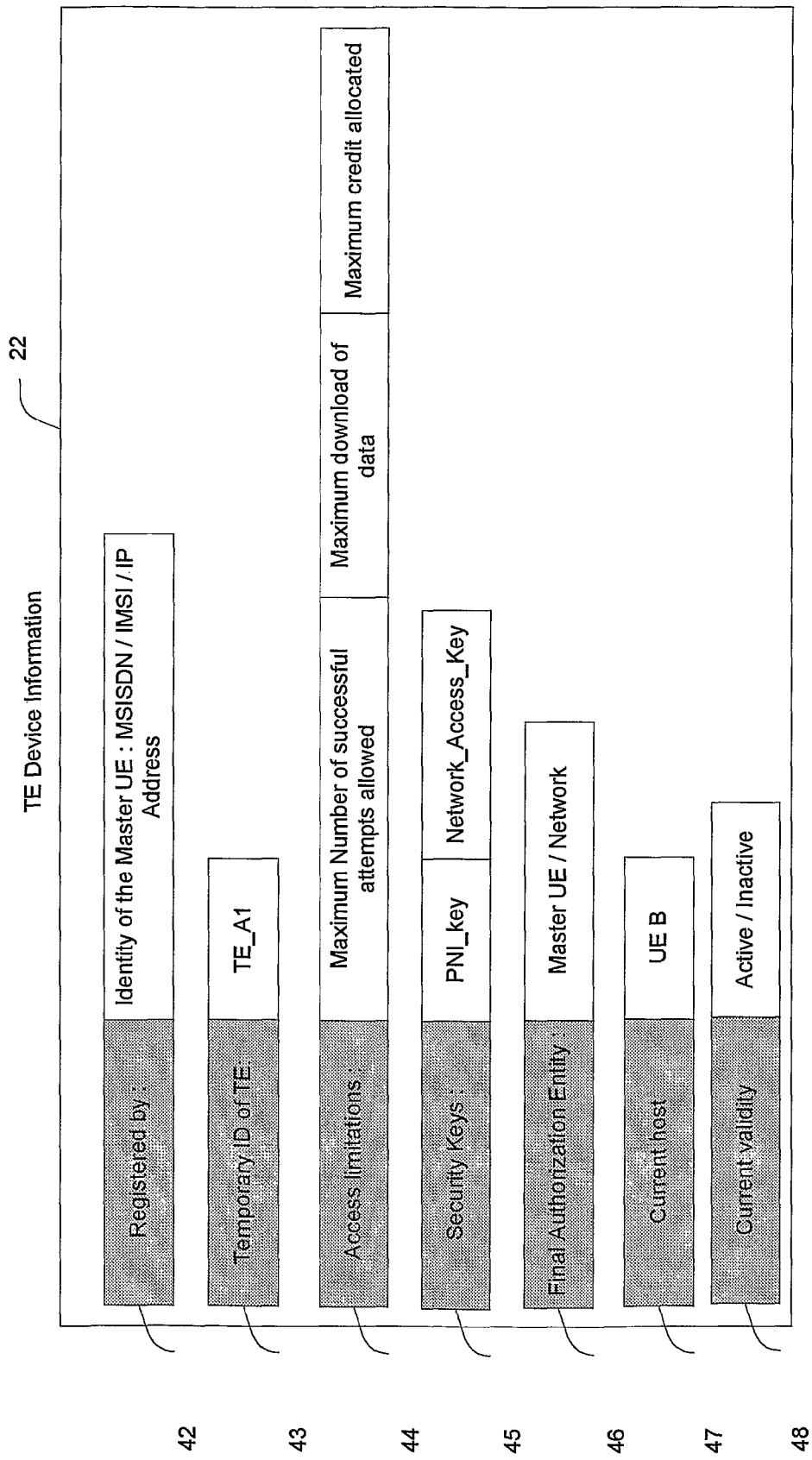
FIG. 4 is a diagram illustrating the data structure of TE device information required for indirect access to WAN, according to the preferred embodiment of the invention.

FIG. 4 describes a general data structure of TE device information 22 which may be the information used to enable a TE to access the network indirectly. It may contain the identity of the master UE 12 which registered the particular TE. This ID may be an MSISDN, IMSI, IP address or local ID, but is not limited to these. This identity will be used to link the TE to its personal network. A temporary ID 43 may be assigned to the TE which identifies the TE uniquely. The owner of the TE may also place access limitation 44 on the TE to ensure minimal damage in the case of the device being compromised. These access limitations may be the maximum number of successful attempts by the TE, maximum download by the TE, maximum credit the TE may be billed, etc. Once these limits are reached the PN server 10 may then deny access to the TE. To ensure additional security a user may also have an additional authentication 46 of the TE by the master UE 12 when it is accessing indirectly. Therefore the TE may have to authenticate with both the PN server 10 and its master UE 12. The PN server 10 may also store the device ID of the UE (including but not limited to MSISDN or IP address or URL), to which the TE is currently attached to 47 when accessing the network. The TE device information 22 may also contain a field for current validity 48. In case of registration of TE A 16, this field may convey validity of access by TE A 16. In case of deregistration, this field may convey inactivity/invalidity of access by TE A 16. This field may be used if purging of TE device information 22 is not opted for incase there may be future instances of the TE A 16 requiring access under the same conditions.

Figure 5:
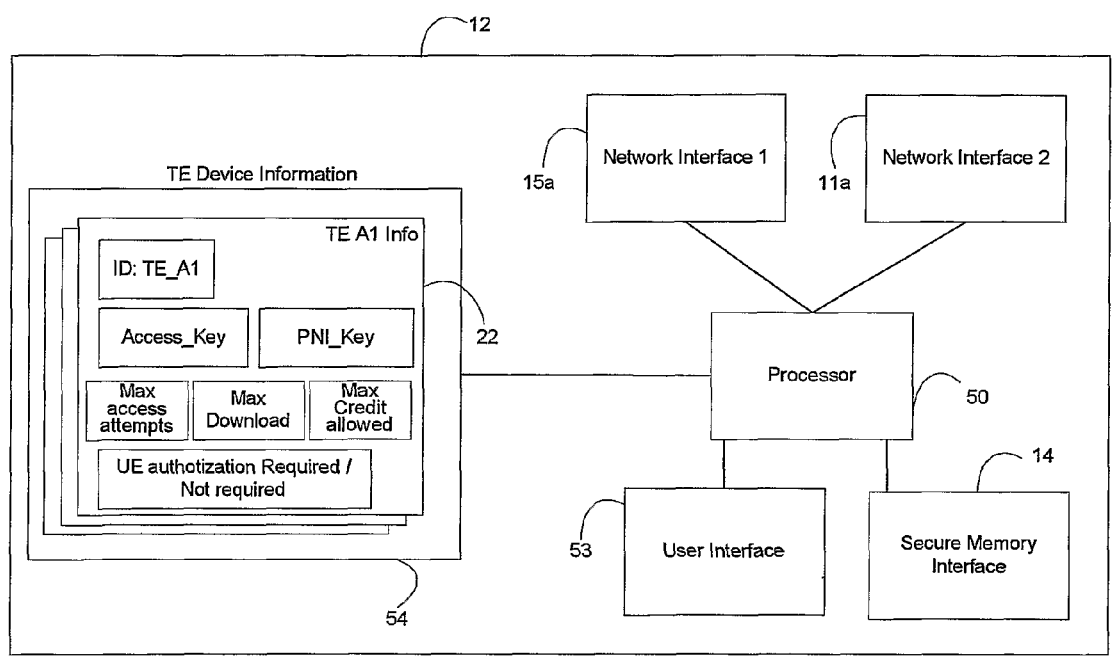
FIG. 5 is a diagram illustrating the components of master UE, according to the preferred embodiment of the invention.

FIG. 5 illustrates the apparatus of a master UE 12 relevant to this invention. The master UE 12 may have multiple interfaces, 15a and 11a. 15a is an interface to link 15, and 11a is an interface to link 11. The master UE 12 may have a processor 50 which executes code to various processes such as key generation, forwarding data between interfaces, processing and accessing stored TE device information 22, enabling user interfaces to initiate user procedures. The master UE 12 may have a user interface which enables the user to execute various user procedures such as nominating a UE as the master UE 12, registering or deregistering TE and enabling various access limitations for the TE. Master UE 12 may also be comprised of TE device information 22 which it may use to set parameters during TE registration.

The UE when acting as a forwarding device and not necessarily a master UE 12 may simply be comprised of multiple interfaces 15a and 11a, and the processor 50 executes code which enables forwarding data between the interfaces. The user interface of UE acting as an access point may also provide procedures to allow or deny other TE to attach to it.

Figure 6:
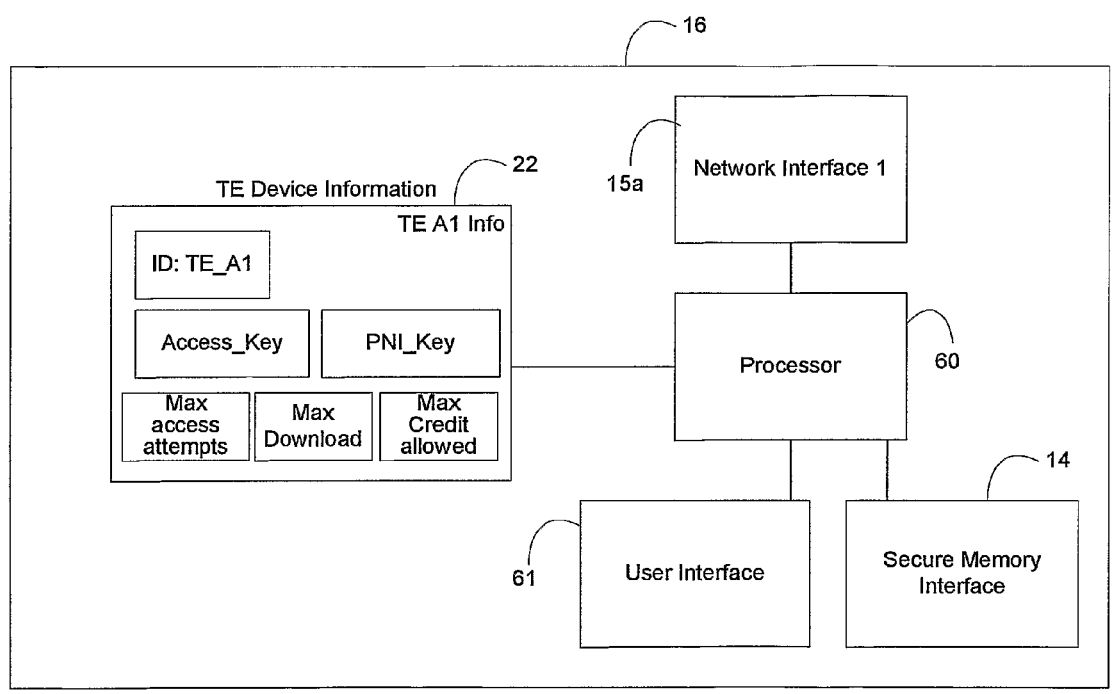
FIG. 6 is a diagram illustrating the components of TE, according to another embodiment of the invention.

FIG. 6 illustrates the apparatus of a TE A 16 relevant to this invention. It may be comprised of at least a single interface 15a to link 15. It may also be comprised of a processor 60 which executes code for enabling various procedures such as security association with the PN server 10 and master UE 12, obtaining access and PNI keys from master UE 12, and access and processing of TE device information 22, estimating access capabilities using the access limitations of the TE A 16. The TE A 16 processor 60 may be comprised of TE device information 22 including key information, device ID, and other metrics to determine access capabilities.

Figure 7:
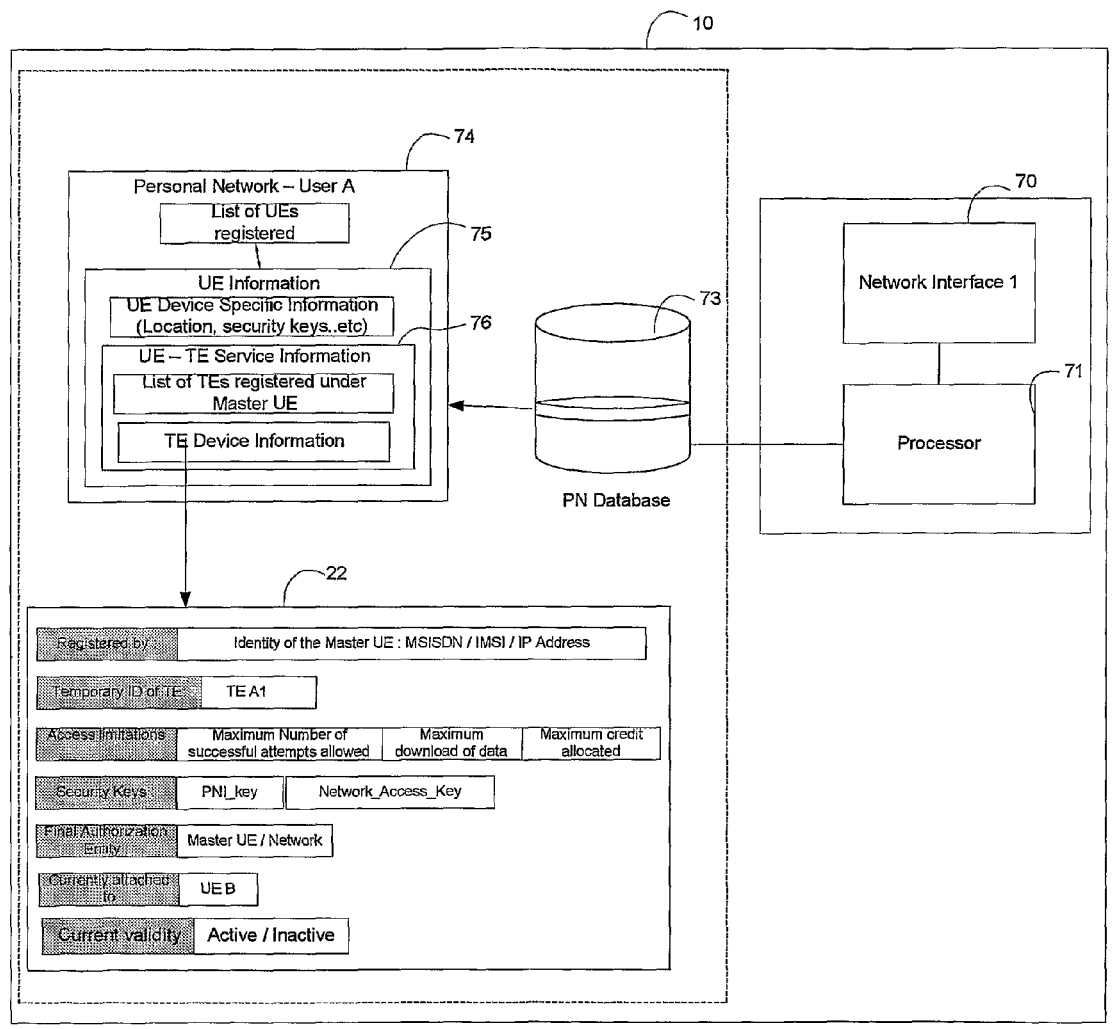
FIG. 7 is a diagram illustrating the components of a PN server, according to the preferred embodiment of the invention.

FIG. 7 illustrates the apparatus of a PN server 10 relevant to this invention. The PN server 10 is comprised of a network interface 70 used for all communications with UE. It also is comprised of a processor 71 which accesses and processes information relevant to personal networks and PANs. The processor may execute code for processes such as registration/deregistration of a TE for indirect access, access of personal network information, key generation and storage of access keys relevant to TE, security association procedures with TE, processing access limitation information, processing TE device information 22. The PN server 10 may also be comprised of a PN database, which is a storage area for all personal network related information. Relevant to this invention, the PN database 73 may have a list of UE registered in a personal network under each user. Each UE registered may further have its own device information such as security keys and location information. Each UE may also have a list of TE directly registered under it. TE device information 22 of each of these registered TE may also be stored.

Figure 8:
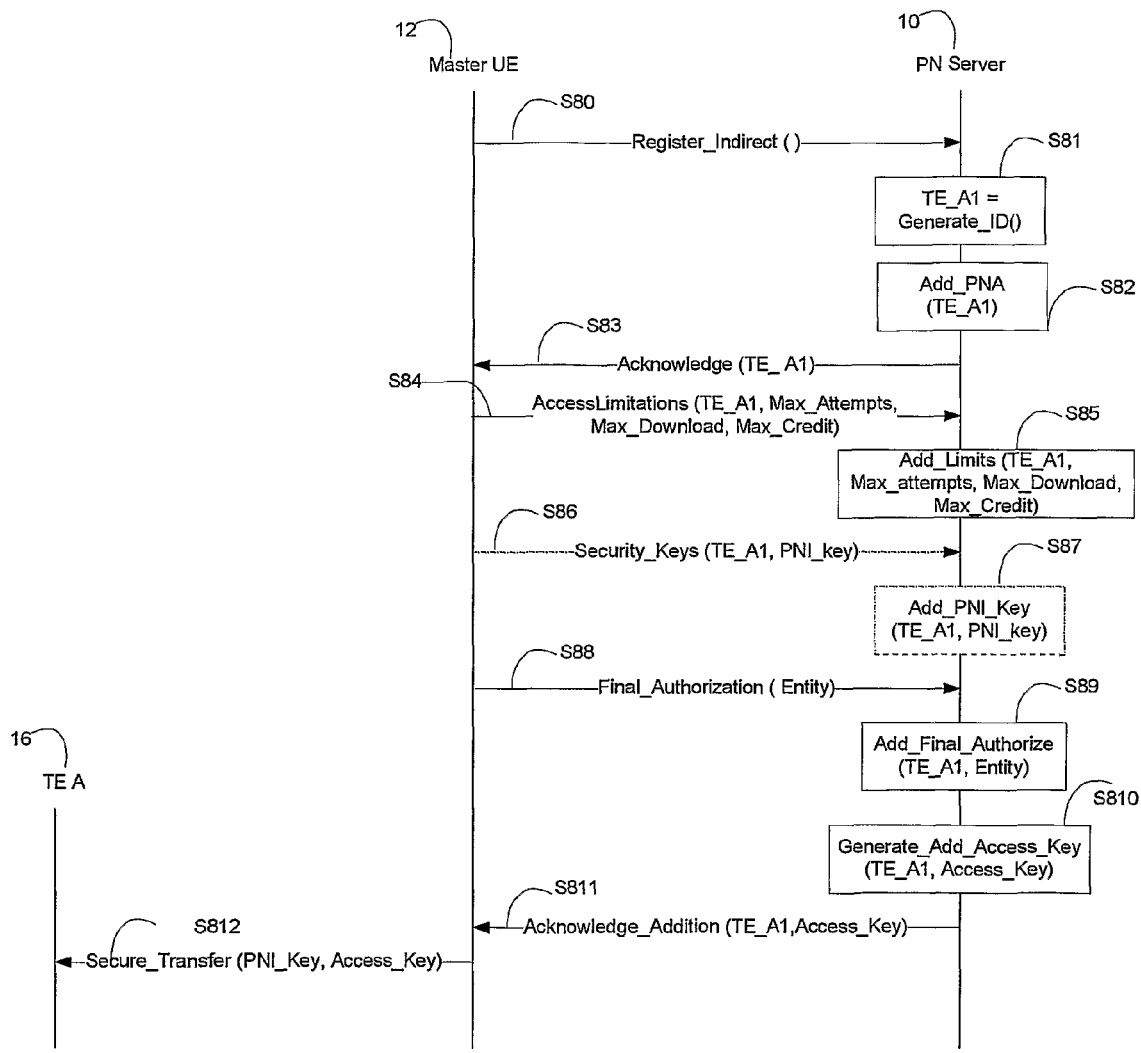
FIG. 8 is a diagram illustrating the sequence diagram for registration for indirect access of TE, according to the preferred embodiment of the invention.

FIG. 8 illustrates the steps involved in registering TE for indirect access at the PN server 10. These steps are carried out using link 11a and link 14 when TE A is within user A personal network. When a user wishes to provide indirect access facility to TE, he may use the user interface 53 of the master UE 12 to initiate a registration for indirect access message, as in step S80. In the next step S81, the PN server 10 recognizes this message and the EN server processor 71 generates a temporary ID for TE A, henceforth referred to as TE_A1 43. The PN server may then add this ID, TE_A1 43 to its TE device information 22, as in step S82. The EN server 10 may then acknowledge master UE's 12 request of registering TE A 16, as in step S83, which may prompt the user to provide more options if any. The user may wish to exercise restrictions of access on the TE A 16 when it accesses the network independently through other UEs. These restrictions may be in terms of maximum successful attempts, maximum download capabilities and maximum credit allocated, or even type of content/service that may be accessed by TE A 16. Master UE 12 may send this information to the PN server 10 with the temporary ID of TE A 16 assigned, as in step S84. The PN server 10 may then add these details to the TE device information 22 in its PN database 73, as in step S85. Steps from S86 to S89 are performed if the user wishes to extend the final authentication of TE_A1 16 to the master UE to ensure notification of TE access and also higher security. This information is passed to the PN server 10 by the master UE 12 in step S88, which may be added by the PN server 10 to TE device information 22, as in step S89. The PN server 10 processor 71 may then generate an access key for TE_A1 16, as in step S810. This access key is to be used by the TE_A1 16 to authenticate itself to the PN server 10 when accessing through another UE. In the next step S811, the PN server 10 may acknowledge the addition of TE_A1 16 for indirect access to the network. In the next step S812, the master UE 12 may securely transfer the access key to TE_A1 16. This transfer may be done using secure memory or alternate secure means.

In another embodiment, the PNI_key of the PN may also be sent by the master UE to the PN server 10 which is shown in S86. The PNI_key may be the shared secret key or a user password used by devices in a personal network to authenticate to the master UE 12 or other devices. This PNI_key may also be added to the TE device information 22. The PNI_key may then be stored in the TE device information 22 by the PN server as in step S87.

In another embodiment, a user may have stored the parameters for the TE device information 22 in the master UE 12. The master UE 12 may simply use these pre-stored parameters to increase the efficiency of the above sequence of steps.

In another embodiment, a default mode may be used with simple messages of request for register by master UE 12, step S80, and acknowledgement of addition by PN server 10, step S811. When a user does not set any limitations on indirect access, the service provider may add his own suitable parameters or neglect them and grant acknowledgement without limitations.

Figure 9:
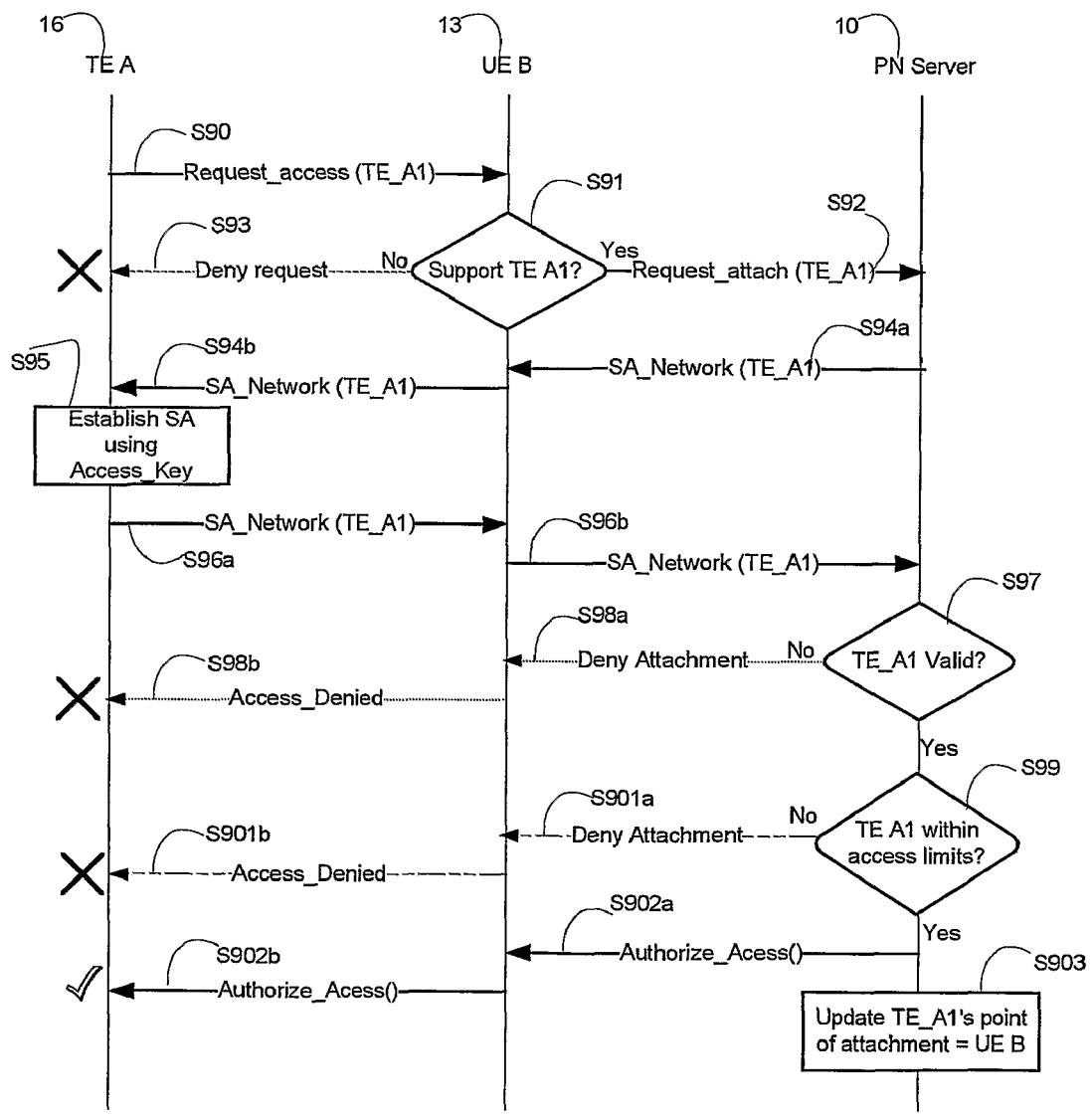
FIG. 9 is a diagram illustrating the sequence diagram for indirect access of TE with PN server authentication, according to the preferred embodiment of the invention.
Figure 10:
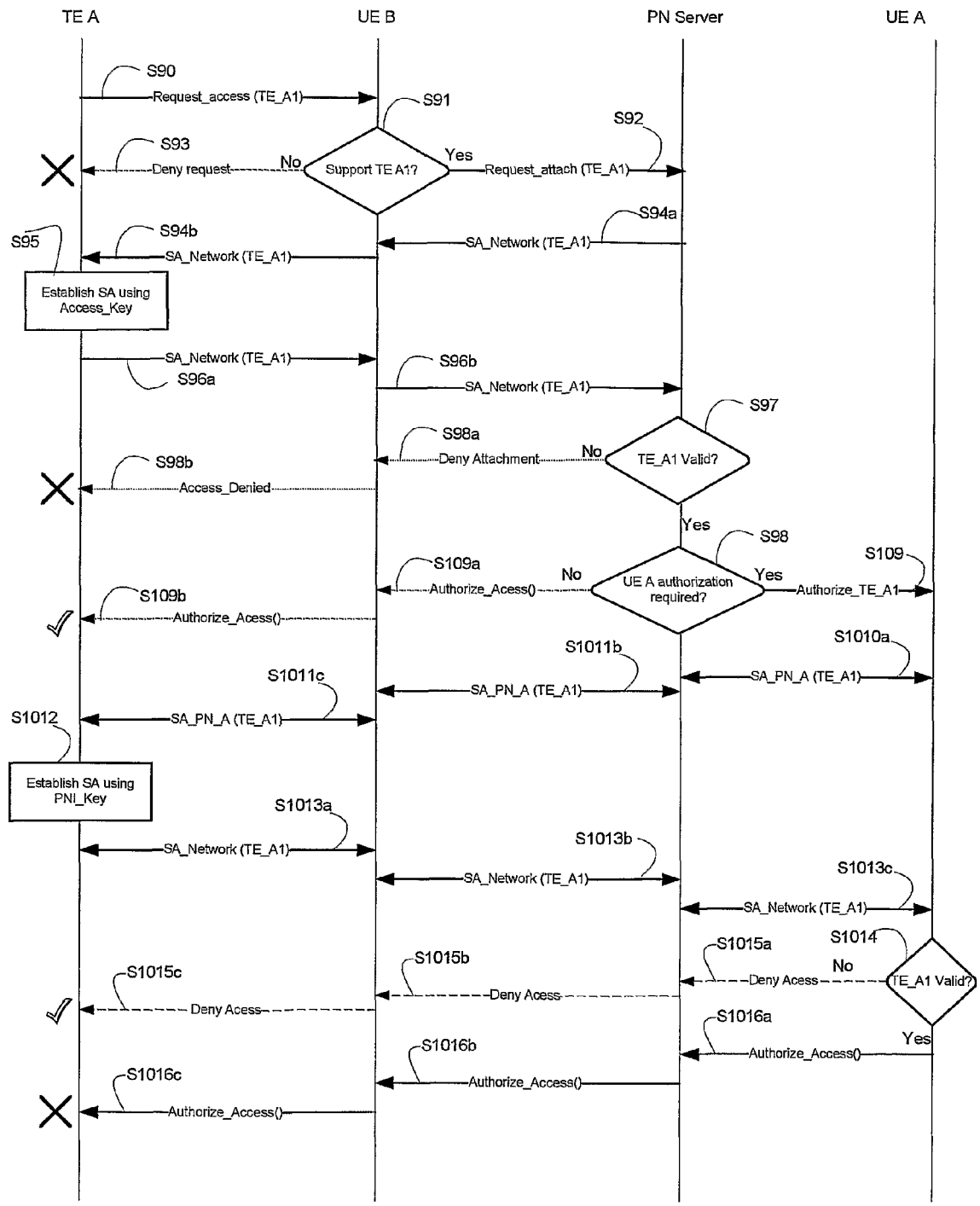
FIG. 10 is a diagram illustrating the sequence diagram for access of TE with UE A, according to the preferred embodiment of the invention.

FIG. 9 illustrates the sequence of steps in TE A 16's access of the network through UE B 13, which acts as a forwarding device. These steps are carried out using link 11b and link 15 when TE A is within an ad-hoc network PAN. In step S90, TE A 16 initiates a request for access. This message may even be a broadcast message to all nearby UE. Conversely, UE may also be broadcasting their intention to attach other TE such as router advertisements or higher layer attach messages. TE can use these broadcast messages to attach themselves to the UE for future communications. There may also be a user interface at UE B 13 to request the user for attachment or it may already be in access point mode where it acknowledges requests for attachment by other TE. This decision step of whether to accept the TE A 16 as an attachment is shown in step S91. When a UE B 13 decides to support TE A 16, it requests the PN server 10 to enable UE B 13 to go into access point mode in S92. The PN server 10 may then initiate security association procedures using standard authentication protocols such as DIAMETER, RADIUS, SIP authentication or EAP in steps S94a and S94b, where UE B 13 simply forwards all messages to TE A 16. TE A 16 is able to respond to messages from the PN server 10 and establish as SA as in step S95, using the access key it obtained during TE registration. The security association may be completed as in steps S96a and S96b. The PN server 10 may then verify the responses and determine if TE A 16 is valid as in step S97. TE A may also acquire an IP address from the PN Server once registered, which may be based on UE B's prefix to aid routability. In addition, at step S97 the PN server 10 may also verify the current validity status in the TE device information 22 to check if TE A has been deregistered. If it is found invalid, it denies access to TE A 16 as shown in steps S98a and S98b. If valid, the PN server 10 may authorize TE A 16 access into the network or may check if TE A 16 is currently within its access limits as in step S99. For example, it may check if TE A 16 has already exceeded the maximum access attempts, or exceeded the maximum download limit or maximum allocated credit. This is done by the PN processor verifying entries in the TE device information in its PN database. If it has already exceeded these limits, PN server 10 issues a denied access message through UE B as shown in steps S901a and S901b. When TE A 16 is within its limit for access, it is authorized to access the network through UE B 13. The PN server 10 then updates TE A's 16 point of attachment in the 1 network as UE B 13 in the TE device information, as in step S903.

In another embodiment, after step S99 of checking limits, the PN server 10 may check if the particular TE A 16 requires further authorization from its master UE 12. If this is required, an SA is established between TE A 16 and master UE 12, by which TE A 16 may be authenticated by Master UE 12 using its PNI_key.

In another embodiment, the PN server 10 may check if TE A 16 has already been deregistered by the master UE by verifying the validity field.

As an example of the use of this invention, it may be assumed that a user owns a mobile phone (master UE 12), a PDA and an MP3 player (TE A 16). The mobile phone is able to obtain cellular connectivity, whereas the PDA and the MP3 player (TE A 16) only have Bluetooth connectivity. The PDA and the MP3 player (TE A 16) may use the mobile phone (master UE 12) as an access point or as a forwarding device to access the network. But this usage may result in the case of overloading the mobile phone in terms of bandwidth, power and processing capabilities, thus limiting the practicality of the use case. Using the present invention, the mobile phone (master UE 12) could register some of the devices (TE A16) attached to it with the service provider for indirect access. For example, assuming the MP3 player (TE A 16) is able to register. The MP3 player (TE A 16) will then be able to attach to any other nearby mobile phone (UE B 13) willing to act as an access point, possibly in order to claim credit from the service provider. Once it attaches to other mobile phones, it may continue accessing the network, and the network is able to distinctively recognize and control access of the MP3 player (TE A 16) using its previous registration parameters (access keys, access limitations), despite a different point of attachment (UE B 13). This way, the service provider is able to maximize the usage of the network where a single user is using multiple points of attachment possible multiplying the usage of the network.

For higher security, TE A 16 may still be required to process status messages every set of time periods to ensure it locally connected to its master UE 12. This aspect is out of scope of this invention. In this way the service provider may manage multiple accesses with a single subscription without the complication of pre-installed trusted code in all devices or over the air download over untrusted sources.

In another application of the invention, charging is simplified as the network may use the service provider charging software at the network itself to charge or bill the TE instead of charging by UE B. The PN server 10 is able to map TE A 16 to its owner and therefore is able to charge TE A 16. In addition to preventing UE B 13 from resending messages which it may have copied to claim additional credit, TE A 16 may add sequencing in its data. Since the data can be only be seen by the TE A 16 and the PN server 10, the PN server 10 or other charging software at the network may verify these sequences to check if it is repeated data or valid data sent by TE A 16.

This application is based on the U.S. Provisional Application No. 60/765,169 filed on Feb. 6, 2006, entire content of which is expressly incorporated by reference herein.

INDUSTRIAL APPLICABILITY

The present invention is applicable to indirect access to a network.

The invention claimed is:

1. A communication control system comprising:
    terminal equipment of a personal network, the terminal equipment not having a subscriber relationship with a service provider;
    a personal network server configured to store terminal equipment device information comprising data that is used to allow terminal equipment access to a wide area network, and configured to authenticate the terminal equipment based on the terminal equipment device information;
    master user equipment of the personal network configured to request a registration of the terminal equipment to the personal network server based on master user equipment credentials, and configured to, when the request is accepted, transfer to the terminal equipment the data that is obtained from the personal network server and that is used to allow the access to the wide area network, the master user equipment having a subscriber relationship with the service provider; and
    access point user equipment of an ad hoc network configured to, upon receiving a request from the terminal equipment to which the data used to allow the access is transferred, perform forwarding operations in sequence between the terminal equipment and the personal network server, so that, after the personal network server verifies the registration of the terminal equipment, the terminal equipment that sent the request is allowed by the personal network server to access the wide area network indirectly through the access point user equipment, the access point user equipment having a subscription with the service provider.

2. The communication control system as claimed in claim 1, wherein the terminal equipment device information further comprises a device identity of the master user equipment it is registered under.

3. The communication control system as claimed in claim 1, wherein the terminal equipment device information further comprises a network access key to be used by the terminal equipment to authenticate itself.

4. The communication control system as claimed in claim 1, wherein the terminal equipment device information further comprises a field for storing a temporary identity of the terminal equipment.

5. The communication control system as claimed in claim 1, wherein the terminal equipment device information further comprises a field for storing a personal network identity key that enables the terminal equipment to authenticate itself.

6. The communication control system as claimed in claim 1, wherein the terminal equipment device information further comprises a field for storing a final authorization entity that is used to denote whether the master user equipment is to finally authorize the access by the terminal equipment.

7. The communication control system as claimed in claim 1, wherein the terminal equipment device information further comprises a field for storing a device identity of user equipment to which the terminal equipment is currently attached.

8. The communication control system as claimed in claim 1, wherein the terminal equipment device information further comprises a field for storing current validity of access of the terminal equipment.

9. The communication control system as claimed in claim 1, wherein the terminal equipment device information further comprises fields for storing access limitations for the terminal equipment.

10. The communication control system as claimed in claim 9, wherein the access limitations further comprise maximum number of successful access attempts allowed by the terminal equipment.

11. The communication control system as claimed in claim 9, wherein the access limitations further comprise maximum downloadable data by the terminal equipment.

12. The communication control system as claimed in claim 9, wherein the access limitations further comprise maximum credit allocated for the terminal equipment.

13. The communication control system as claimed in claim 9, wherein the access limitations further comprise a list of particular services that may be accessed by the terminal equipment.

14. The communication control system as claimed in claim 1, wherein the personal network server comprises:
    a network interface with the master user equipment used for terminal equipment registration;
    a network interface with the access point user equipment acting as a forwarding device, to perform terminal equipment authentication and authorization;
    a processor that executes code to process registration for indirect access requests, accessing and processing terminal equipment device information, generation of access keys, transfer of access keys to master user equipment, authentication of terminal equipment, and verification of access limitations for a terminal equipment; and
    a personal network database comprising the terminal equipment device information.

15. The communication control system as claimed in claim 14, wherein the personal network database of the personal network server further comprises:
    a list of user equipment registered under the personal network; and
    a list of terminal equipment registered under each user equipment, and wherein the terminal equipment device information further comprises
    a device identity of the master user equipment the terminal device is registered under; and
    a network access key to be used by the terminal equipment to authenticate itself.

16. The communication control system as claimed in claim 15, wherein the terminal equipment device information further comprises a field for storing a temporary identity of the terminal equipment.

17. The communication control system as claimed in claim 15, wherein the terminal equipment device information further comprises a field for storing a personal network identity key that enables the terminal equipment to authenticate itself to its master user equipment.

18. The communication control system as claimed in claim 15, wherein the terminal equipment device information further comprises a field for storing final authorization entity which is used to denote whether master user equipment is to finally authorize terminal equipment access.

19. The communication control system as claimed in claim 15, wherein the terminal equipment device information further comprises a field for storing a device identity of the user equipment to which the terminal equipment is currently attached.

20. The communication control system as claimed in claim 15, wherein the terminal equipment device information further comprises a field for storing current validity of access of terminal equipment.

21. The communication control system as claimed in claim 15, wherein the terminal equipment device information further comprises fields for storing access limitations for the terminal equipment.

22. The communication control system as claimed in claim 1, wherein the personal network further comprises:
   at least one master user equipment; and
   at least one terminal equipment.

23. The communication control system as claimed in claim 1, wherein the master user equipment comprises:
   at least one network interface configured to communicate with the terminal equipment;
   at least one network interface configured to communicate with the personal network server;
   a secure memory interface configured to store access keys of attached terminal equipment; and
   a processor configured to execute code to send terminal equipment registration request messages to the personal network server, to send terminal equipment device information related messages to the personal network server, and to enable secure transfer of access keys and device identities to the terminal equipment.

24. The communication control system as claimed in claim 23, wherein the master user equipment further comprises a data store configured to store terminal equipment device information.

25. The communication control system as claimed in claim 23, further comprising:
   a user interface configured to enable initiation of registration of the terminal equipment for indirect access, and enable access limitations for the terminal equipment.

26. The communication control system as claimed in claim 1, wherein the terminal equipment further comprises:
   at least one network interface configured to communicate with the access point user equipment;
   a user interface;
   a secure memory interface configured to store security keys;
   a processor that executes code configured to receive and store access keys from the master user equipment, request access messages to access point user equipment-B, and security association procedures using security keys; and
   a data store configured to store the terminal equipment device information.

27. A method of terminal equipment indirect access of a wide area network through a forwarding user equipment device, comprising the steps of:
   attaching a terminal equipment device to a master user equipment device via a personal network, the master user equipment device having a subscriber relationship with a service provider, the terminal equipment device not having a subscriber relationship with the service provider;
   the master user equipment device requesting a personal network server to register the terminal equipment device for indirect access to the wide area network based on the subscriber relationship of the master user equipment device with the service provider;
   the personal network server storing registration information to permit indirect access of the terminal equipment device to the wide area network after the personal network server authorizes indirect access of the terminal equipment device to the wide area network;
   the personal network server transferring the registration information to the master user equipment device;
   the master user equipment device transferring the registration information to the terminal equipment device;
   attaching the terminal equipment device to the forwarding user equipment device via an ad hoc network, using the registration information from the personal network server, the registration information based on the subscriber relationship of the master user equipment device with the service provider;
   the forwarding user equipment device forwarding the registration information to the personal network server;
   the personal network server verifying that the terminal equipment device is registered; and
   the personal network server authorizing the forwarding user equipment device to allow the terminal equipment device to indirectly access the wide area network through the forwarding user equipment device.

28. The method of terminal equipment indirect access of a wide area network through a forwarding user equipment device, as claimed in claim 27, further comprising the step of the personal network server generating an access key for the terminal equipment device, and then transferring the access key to the master user equipment device.

29. The method of terminal equipment indirect access of a wide area network through a forwarding user equipment device, as claimed in claim 28, further comprising the step of the master user equipment device securely transferring the access key to the terminal equipment device.

30. The method of terminal equipment indirect access of a wide area network through a forwarding user equipment device, as claimed in claim 27, further comprising the step of the personal network server assigning a temporary identity for the terminal equipment device.

31. The method of terminal equipment indirect access of a wide area network through a forwarding user equipment device, as claimed in claim 27, further comprising the step of the master user equipment device setting a final authorization entity as the master user equipment device itself.

32. The method of terminal equipment indirect access of a wide area network through a forwarding user equipment device, as claimed in claim 27, further comprising the step of the master user equipment device sending a personal network identity access key to the personal network server.

33. The method of terminal equipment indirect access of a wide area network through a forwarding user equipment device, as claimed in claim 27, wherein the step of the personal network server verifying that the terminal equipment device is registered further comprises the personal network server checking current validity status of the terminal equipment device.

34. The method of terminal equipment indirect access of a wide area network through a forwarding user equipment device, as claimed in claim 27, further comprising the step of personal network server determining if the terminal equipment device needs to be further authenticated by the master user equipment device.

35. The method of terminal equipment indirect access of a wide area network through a forwarding user equipment device, as claimed in claim 34, further comprising the step of master user equipment device authenticating the terminal equipment device.

36. The method of terminal equipment indirect access of a wide area network through a forwarding user equipment device, as claimed in claim 27, further comprising the step of directly charging the terminal equipment device.

* * * * *